April 20, 1943.  C. W. MARTIN  2,317,072
TIRE TOOL
Filed April 18, 1941  2 Sheets-Sheet 1
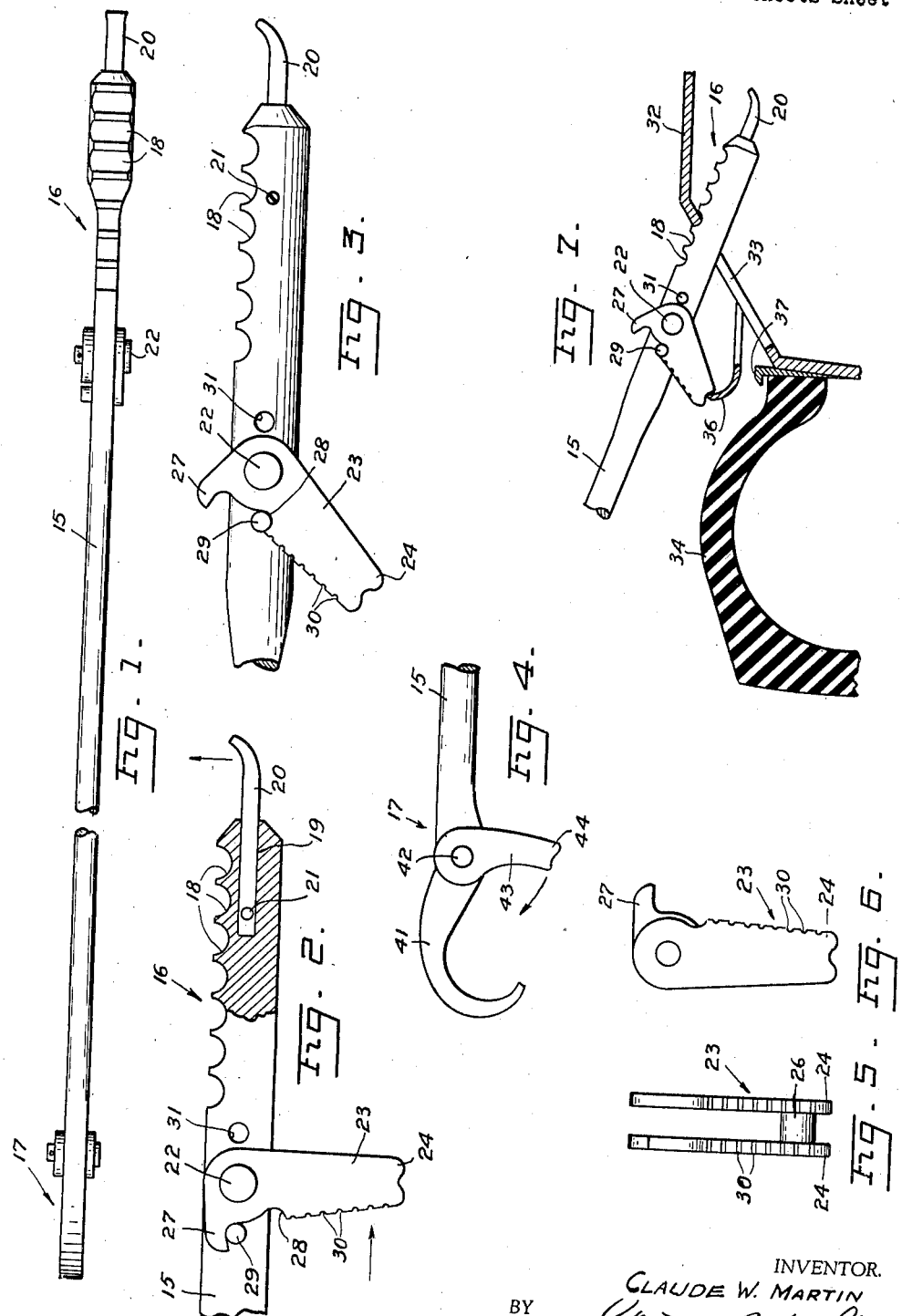
INVENTOR.
CLAUDE W. MARTIN
BY George B. White
ATTORNEY.

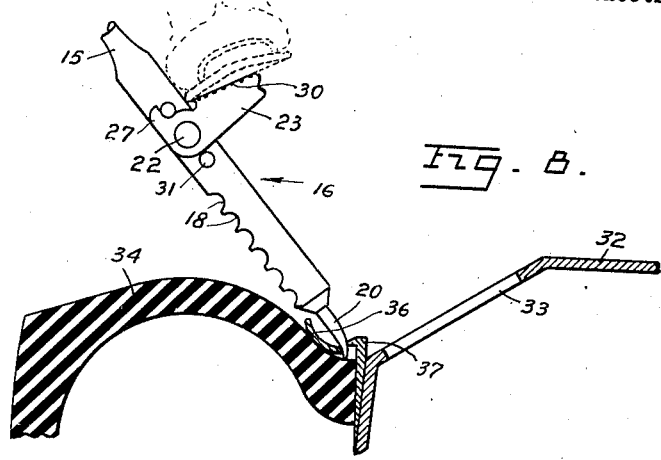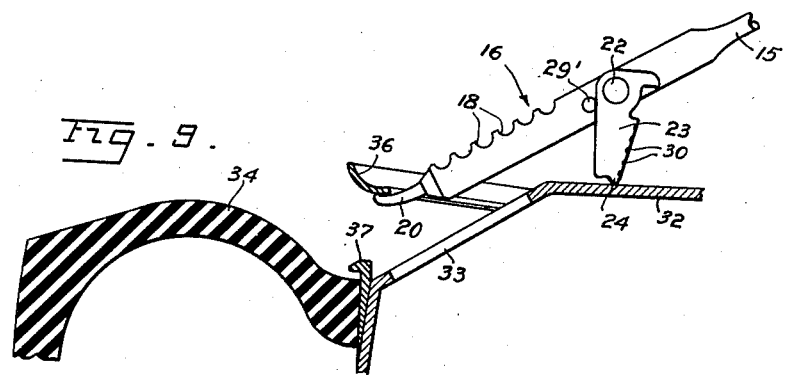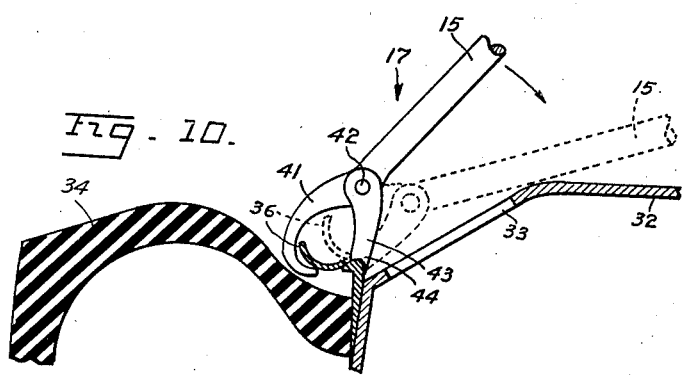

Patented Apr. 20, 1943

2,317,072

UNITED STATES PATENT OFFICE 2,317,072

TIRE TOOL

Claude W. Martin, Gold Hill, Oreg.

Application April 18, 1941, Serial No. 389,149

5 Claims. (Cl. 157—6)

This invention refers to a tire changing tool. The tire changing tool herein described is of the same general type as the tool described in my co-pending application filed July 13, 1940, Serial Number 345,383 issued July 28, 1942, as Patent No. 2,290,887.

The general object of this invention is to provide a tire changing tool which is simple and efficient, and which permits an operator to change a tire with comparatively small effort and by the use of a single tool which takes care of the handling and prying off of the lock ring of the tire in all of its positions relatively to the rim.

Particularly the features of the herein invention include, a provision to make the point of the tool replaceable and of different material than the bar itself, a fulcrum element which can be so positioned as to be held at definite angles both when subjected to foot pressure for forcing the point of the tool toward the rim, and also to be held against collapsing when operating as a fulcrum in pressing the lock ring on the rim or for prying the lock ring off the rim; this feature being accomplished by adjustable backing stops or the like.

Another feature of this invention is to provide a tire changing tool both ends of which are adapted for exerting forces for the removal of the tire and lock ring; one point or end being used for placing the tire and the lock ring on the rim and for initially loosening and prying off the ring and the tire, and the other end being adapted to engage inner peripheral points of the locking ring and the edge of the rim so as to exert a leverage for lifting the ring over the lock of the rim with ease.

It will be understood that various changes may be made in the details of construction herein shown provided said changes come within the scope of the claims.

The invention is clearly illustrated in the accompanying drawings wherein:

Fig. 1 is a fragmental plan view of my tire changing tool.

Fig. 2 is a fragmental, partly sectional view of one end of the tool, showing its fulcrum arm substantially at right angles to the bar, for foot pressure.

Fig. 3 is a side view of the same end of the tool showing the fulcrum arm in inclined position for engagement with the rim or with the wheel.

Fig. 4 is a fragmental view of the lifting end of the tool.

Fig. 5 is an end view of the fulcrum arm.

Fig. 6 is a side view of the fulcrum arm.

Fig. 7 is a fragmental side view of the tool showing it in position for pushing the lock ring into locking position on the rim.

Fig. 8 is a fragmental side view of the tool showing it in foot pressure position for loosening the ring away from the rim.

Fig. 9 is a fragmental view of the tool showing it in position for pulling the ring off the rim.

Fig. 10 is a fragmental view of the tool showing the lifting end of the tool in ring lifting position on the wheel.

In this invention I make use of a bar or hand lever 15, which is provided with a prying end 16 and a lifting end 17. The intermediate portion of the bar is of sufficient length for convenient handling and gripping between the ends 16 and 17 and for exerting the desired leverage for the respective operations in the removal or replacing of lock rings and tires on tire wheel or rims. The prying end 16 of the tool is provided with a plurality of transverse notches 18. The notched end of the bar is suitably enlarged for the forming of a socket 19 in the end thereof, into which is inserted a point 20. A suitable screw 21 secures the inserted point 20 in place in the socket 19. The point 20 is made of a much harder steel than the material from which the bar 15 is made. This arrangement allows the use of points of various suitable materials and also of various shapes or dimensions according to need in connection with the particular type of lock ring or wheel on which the tool is used. It is to be understood however that the shape and proportions shown in the herein engagement are satisfactory for a large variety of lock rings and wheels.

Spaced from the inner end of the series of notches 18 and substantially parallel with the notches 18 is a fulcrum pin 22 which extends transversely through the bar 15. A fulcrum member 23 constructed of parallel elements is fulcrumed at one end thereof on the pin 22 so that it straddles the bar 15. The free ends 24 of the elements forming the fulcrum member 23 are for engagement with the edges of the lock rings of wheels. Near the free end 24 of the fulcrum member 23 is a connecting pin 26 to hold the parallel elements in alignment at the free ends thereof. The fulcrumed end of one of the fulcrum elements is formed with an abutment arm 27 and with an abutment recess 28 substantially opposite each other along the edge of the fulcrum element facing away from the notches 17. An abutment pin 29 is removably placed in a hole in the bar 15 parallel with the fulcrum pin 22 and so located as to be engaged by the abutment arm 27 of the fulcrum member 23 when said fulcrum member 23 is substantially at right angles to the axis of the bar 15, as shown in Figure 2. The abutment pin is abutted by the abutment recess 28 when the fulcrum member 23 is in an angular position pointing away from the notched end of the bar 15, as shown in Figures 3 and 7.

The edges 30 of the fulcrum member 23 which face away from the notched end of the bar 15 are roughed or knurled so as to provide a friction surface for the foot when used in the position shown in Figure 8. Another hole 31 is provided between the fulcrum pin 22 and the notched end of the bar 15 located substantially symmetrically with the first position of the abutment pin 29 so that the pin 29 can be transferred into abutment position in this hole 31 for a co-action with the back of the fulcrum member 23 in the prying operation shown in Figure 9. It will be noted that fulcrum member 23 is held in suitable angular positions, and is prevented from collapsing in the various operative engagements of the prying end 16 of the tool. These operative positions of the prying end 16 are illustrated in Figures 7, 8, and 9 of the drawings.

In the herein illustration the usual wheel includes a disc 32 which has one or more apertures 33 near its periphery. A tire 34 is placed over the rim of the disc 32 and it is held in place by a lock ring 36, which latter when in place fits into the annular groove or recess of a retaining flange 37 on the rim of the wheel. Figure 7 illustrates the use of the prying end 16 of the tool for pushing the lock ring 36 over the flange 37 of the wheel rim. It is to be noted that in this position a practically fixed triangle is formed between one of the notches 18 engaged with the edge of the wheel disc opening 33, the dented end 24 bearing against the edge of the lock ring 36, and the abutment of the abutment recess 28 against the abutment pin 29. In other words, the force applied to the bar 15 to push the lock ring 36 in is fulcrumed around the point of engagement between the notch 18 and the edge of the aperture 33 of the disc wheel 32, and it is applied through the dented end 24 of the fulcrum arm 23, which latter however is held at an outwardly pointing angle and against collapsing by the abutment pin 29.

Figure 8 illustrates the position of the tool for loosening the lock ring away from the groove of the rim flange 37. For this purpose the point 20 is inserted between the rim flange 37 and the lock ring 36, and by stepping on the fulcrum member 23 the prying force is applied for the loosening and partial removal of the lock ring 36. It is to be noted that the point 20 here is pointed and narrow so that it can be turned around during the prying operation and fulcrumed around the rim flange 36 without any interference from the body of the notched end of the tool. At the same time the socket in the notched end of the tool provides firm bearing and grip for the manipulation of the prying point 20. If the point 20 is bent or if it breaks, it can be easily replaced. During this operation the abutment arm 27 of the fulcrum arm 23 abuts against the abutment pin 29 as the operator's foot is pressed on the knurled edge 31 of the fulcrum arm 23 for pressing the tool downwardly toward lock ring 36. Thus the force is directed with more positiveness and is applied directly under the portion where the point 20 is to penetrate between the lock ring 36 and retaining flange 37. This renders the loosening step of the operation much easier and quicker.

Figure 9 illustrates the removal of the lock ring 36 from the wheel after the lock ring is off the retaining flange 37. In this operation the point 20 is placed under the portion of the lock ring 36 which is partly lifted off the rim of the wheel, and then the bar 15 is depressed so as to fulcrum around the dented end of the fulcrum arm 23 for prying the lock ring 36 entirely free from the wheel. This last step of operation is repeated around the periphery of the wheel until all the portions of the lock ring 36 are removed. In this position the fulcrum arm 23 is held against collapsing by placing an abutment pin 29' into the second hole 32 of the bar 15, so that the back side of the fulcrum arm 23 abuts against the pin 29'. During this operation the first pin 29 is shifted or pulled out of the way of the abutment arm 27. Thus by a slight adjustment of abutment pins the position of the fulcrum arm 23 in this removal step is positively determined and held.

The lifting end 17 of the tool is used between the steps, illustrated in Figure 8 and Figure 9, and frequently takes the place of the step shown in Figure 9, for lifting or pulling the lock ring off the top of the retaining flange 37. The lifting end 16 includes a hook 41 fixedly formed on the lifting end of the bar 15. The base portion of the hook 41 is widened to accommodate a pivot 42 transversely of the plane of the hook and at about the point where the hook extends from the bar 15. On this pivot 42 is fulcrumed a slightly curved fulcrum arm 43 which has a dented bearing end 44. This bearing end 44 fits over the outer face of the retainer flange 37. The fulcrum arm 43 is considerably shorter than the length of the hook 41, so that the hook 41 can assume a position behind and under the lock ring 36 while the fulcrum arm bears against the side of the flange 37, as shown in Figure 10. The use of this hooked lifting end greatly facilitates the removal of the lock ring 36.

The lock ring 36 is first pried out of the groove of the rim flange 37 and is lifted to about the top of the flange 37 at one portion of its periphery by the point 20 of the prying end 17. The beginning of this prying operation is illustrated in Figure 8. The completion of the initial prying at the portion where the removal is started is shown in Figure 10. Then the tool bar 15 is reversed and the hook 41 is placed under the lock ring 36 and the bearing end 44 of the fulcrum arm 43 is placed against the side of the rim flange 37. Then the bar 15 is pressed downwardly, toward the face of the wheel 32 in the direction of the arrow on Figure 10. The force thus applied is fulcrumed around the bearing end 44 of the fulcrum arm 37 and lifts the lock ring 36 to the raised position over the top of the rim flange 37 as shown in broken lines in Figure 10. Then the same operation is repeated with the hooked lifting end 16 all around and the lock ring is lifted off the wheel without again reversing the tool.

The tool herein described permits the removal of the heaviest truck tires by one person and by one tool without requiring great exertion. The lock ring is pried loose by the prying end of the tool and then it is progressively lifted off and over the rim flange by the use of the lifting fulcrum and hook on the lifting end of the tool. The tool can be made at a low cost, it is simple in structure and operation and comparatively light, and therefore it readily lends itself for use by the average operator.

I claim:

1. In a tire changing tool of the character described, a bar, a fulcrum arm near an end of the bar, a removable prying point in said end of the bar, a side of the bar having spaced notches between said end of the bar and said fulcrumed arm for engagement with the disc of a tire wheel for exerting a turning moment on the end of the fulcrum arm, and adjustable means to hold said fulcrum arm at an acute angle with respect to the bar end in the direction toward the exertion of pressure by the fulcrum and on the side of the bar opposite from said notches.

2. In a tire changing tool of the character described, a bar, a fulcrum arm near an end of the bar, a prying point at said end of the bar, means between said end of the bar and said fulcrum arm and on a side of the bar for engagement with the disc of a tire wheel for exerting a turning moment on the end of the fulcrum arm, a pair of spaced abutments on an edge of the fulcrum arm adjacent the pivot of the fulcrum arm, and a stop on the bar extended between said abutments so as to be engaged by the respective abutments when the fulcrum arm is swung in opposite directions so as to hold said fulcrum arm at an angle and on the side of the bar opposite to said engagement means when under pressure.

3. In a tire changing tool of the character described, a bar, a fulcrum arm near an end of the bar, a prying point at said end of the bar, means between said end of the bar and said fulcrum arm for engagement with the disc of a tire wheel for exerting a turning moment on the end of the fulcrum arm, a pair of spaced abutments on an edge of the fulcrum arm adjacent the pivot of the fulcrum arm and a stop on the bar extended between said abutments so as to be engaged by the respective abutments when the fulcrum arm is swung in opposite directions, the relative positions of said abutments and said stop being such that said fulcrum arm is at substantially right angles to the axis of the bar when one of said abutments is in engagement with said stop so as to serve as a foot rest to press toward said prying point, and said fulcrum member is at an acute angle to the axis of the bar pointing away from the nearer end of the bar and substantially oppositely to said engagement means when turned so that the other abutment is engaged with the stop.

4. In a tire changing tool of the character described, a bar, a fulcrum arm near an end of the bar, a prying point at said end of the bar, means between said end of the bar and said fulcrum arm for engagement with the disc of a tire wheel for exerting a turning moment on the end of the fulcrum arm, a pair of spaced abutments on an edge of the fulcrum arm adjacent the pivot of the fulcrum arm and a stop on the bar extended between said abutments so as to be engaged by the respective abutments when the fulcrum arm is swung in opposite directions, the relative positions of said abutments and said stop being such that said fulcrum arm is at substantially right angles to the axis of the bar when one of said abutments is in engagement with said stop so as to serve as a foot rest to press toward said prying point, and said fulcrum arm is at an acute angle to the axis of the bar pointing away from the nearer end of the bar when turned so that the other abutment is engaged with the stop, said stop being removably held in the bar.

5. In a tire changing tool of the character described, a bar adapted to be gripped by a hand, an enlarged head at an end of the bar being notched on one side thereof for engagement with the disc of a wheel, said enlarged head having a socket in the end thereof, a prying point removably secured into said socket, a fulcrum arm pivoted on the bar so as to swing to the side of the bar opposite said notches, and coacting means on said bar and on said fulcrum arm to hold said fulcrum arm at right angles to the bar as a foot rest in one relative position, and to hold the fulcrum at an acute angle to the bar and oppositely to the prying point so that said fulcrum is held under axial pressure respectively by the pulling force on said prying point and by the bearing force on said notches.

CLAUDE W. MARTIN.